United States Patent
Haggerty et al.

(10) Patent No.: US 8,140,230 B2
(45) Date of Patent: Mar. 20, 2012

(54) APPARATUS AND METHOD FOR REGULATING ACTIVE DRIVELINE DAMPING IN HYBRID VEHICLE POWERTRAIN

(75) Inventors: Michael D. Haggerty, Sterling Heights, MI (US); Robert L. Morris, Milford, MI (US); R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 726 days.

(21) Appl. No.: 12/247,354

(22) Filed: Oct. 8, 2008

(65) Prior Publication Data

US 2010/0087996 A1    Apr. 8, 2010

(51) Int. Cl.
*G06F 19/00* (2006.01)
*G01L 3/00* (2006.01)
*F02D 9/00* (2006.01)

(52) U.S. Cl. .... 701/54; 701/111; 73/115.02; 123/192.1; 123/406.28; 303/112; 188/378; 188/381; 464/180; 74/572.2

(58) Field of Classification Search .................. 701/34, 701/29, 58, 51, 67, 22, 54, 111, 102, 99; 903/945; 180/65.2, 65.4; 123/192.1, 406.28, 123/406.24; 73/115.02, 115.01; 303/112; 188/378, 379; 464/180; 74/572.2
See application file for complete search history.

(56) References Cited

U.S. PATENT DOCUMENTS

| | | | | |
|---|---|---|---|---|
| 5,537,967 A * | 7/1996 | Tashiro et al. | | 123/192.1 |
| 5,730,094 A * | 3/1998 | Morris | | 123/192.1 |
| 6,336,070 B1 * | 1/2002 | Lorenz et al. | | 701/102 |
| 6,629,025 B2 * | 9/2003 | Evans et al. | | 701/22 |
| 6,672,415 B1 * | 1/2004 | Tabata | | 180/65.25 |
| 6,718,943 B1 * | 4/2004 | De La Salle et al. | | 123/406.24 |
| 6,953,409 B2 | 10/2005 | Schmidt et al. | | |
| 7,024,290 B2 * | 4/2006 | Zhao et al. | | 701/22 |
| 7,194,398 B2 * | 3/2007 | Abe | | 703/8 |
| 7,245,130 B2 * | 7/2007 | Murphy | | 324/546 |
| 7,292,917 B2 * | 11/2007 | Kuang et al. | | 701/22 |
| 7,305,873 B2 * | 12/2007 | Hubbard et al. | | 73/114.11 |
| 7,315,774 B2 | 1/2008 | Morris | | |
| 7,346,445 B2 * | 3/2008 | Von Schwertfuehrer | | 701/103 |
| 7,438,165 B2 * | 10/2008 | Nerubenko | | 188/380 |
| 7,464,800 B2 * | 12/2008 | Nerubenko | | 188/379 |
| 7,680,567 B2 * | 3/2010 | Syed et al. | | 701/22 |
| 7,739,016 B2 * | 6/2010 | Morris | | 701/51 |
| 2004/0079564 A1 * | 4/2004 | Tabata | | 180/65.2 |
| 2007/0225886 A1 | 9/2007 | Morris | | |
| 2007/0225887 A1 | 9/2007 | Morris | | |

* cited by examiner

*Primary Examiner* — Ronnie Mancho
(74) *Attorney, Agent, or Firm* — Quinn Law Group, PLLC (57) ABSTRACT

The present invention provides an improved method and apparatus for regulating active damping in a hybrid vehicle powertrain. The method includes: monitoring the damping command sent to the active damping system; determining a mean reference point, which may be a filtered value of the damping torque command; determining if the unfiltered damping torque command value switches from one side to the other of the mean reference point; if a switch is detected, determining if the size of the switch exceeds a predetermined minimum; if it does, then increasing a total number of switches; determining if the total number of switches exceeds a switch threshold; if the total number of switches exceeds the switch threshold, determining if the current damping torque exceeds a damping torque threshold; and decreasing the damping torque if the total number of switches exceeds the switch threshold and the current damping torque exceeds the damping torque threshold.

17 Claims, 3 Drawing Sheets

APPARATUS AND METHOD FOR REGULATING ACTIVE DRIVELINE DAMPING IN HYBRID VEHICLE POWERTRAIN

TECHNICAL FIELD

The present invention relates generally to hybrid powertrains, and more specifically to active driveline damping for such hybrid powertrains.

BACKGROUND OF THE INVENTION

Most conventional motor vehicles, such as the modern-day automobile, include a powertrain (sometimes referred to as "drivetrain") that is generally comprised of an engine that delivers driving power through a multi-speed power transmission to a final drive system, such as a rear differential, axle, and wheels. Automobiles have traditionally been powered solely by a reciprocating-piston type internal combustion engine (ICE) because of its ready availability and relative cost, weight, and efficiency. Such engines include 4-stroke compression-ignited diesel engines and 4-stroke spark-ignited gasoline engines.

Hybrid vehicles, on the other hand, utilize alternative power sources to propel the vehicle, minimizing reliance on the engine for power, thereby increasing overall fuel economy. A hybrid electric vehicle (HEV), for example, incorporates both electric energy and chemical energy, and converts the same into mechanical power to propel the vehicle and drive vehicle systems. The HEV generally employs one or more electric machines that operate individually or in concert with an internal combustion engine to propel the vehicle. Since hybrid vehicles can derive their power from sources other than the engine, engines in hybrid vehicles can be turned off while the vehicle is propelled by the alternative power source(s).

Series hybrid architectures, sometimes referred to as Range-Extended Electric Vehicles (REEVs), are generally characterized by an internal combustion engine in driving communication with an electric generator. The electric generator, in turn, provides power to one or more electric motors that operate to rotate the final drive members. In other words, there is no direct mechanical connection between the engine and the drive members in a series hybrid powertrain. The lack of a mechanical link between the engine and wheels allows the engine to be run at a constant and efficient rate, even as vehicle speed changes—closer to the theoretical limit of 37%, rather than the normal average of generative 20%. The electric generator may also operate in a motoring mode to provide a starting function to the internal combustion engine. This system may also allow the electric motor(s) to recover energy from slowing the vehicle and storing it in the battery by regenerative braking.

Parallel hybrid architectures are generally characterized by an internal combustion engine and one or more electric motor/generator assemblies, each of which has a direct mechanical coupling to the power transmission. Most parallel hybrid designs combine a large electrical generator and a motor into one unit, providing tractive power and replacing both the conventional starter motor and the alternator. One such parallel hybrid powertrain architecture comprises a two-mode, compound-split, electro-mechanical transmission which utilizes an input member for receiving power from the I/C engine, and an output member for delivering power from the transmission to the driveshaft. First and second motor/generators operate to rotate the transmission output shaft. The motor/generators are electrically connected to an energy storage device for interchanging electrical power between the storage device and the first and second motor/generators. A control unit is provided for regulating the electrical power interchange between the energy storage device and motor/generators, as well as the electrical power interchange between the first and second motor/generators.

Regardless of architecture, most hybrid powertrains generate driveline vibrations during normal operation, which range from imperceptible to unpleasantly noticeable. Significant driveline vibrations may be objectionable to a vehicle operator, and may reduce service life of one or more driveline components. Historically, driveline vibrations are mitigated by implementing systems which operate to cancel torque oscillations at one specific frequency, over a range of frequencies, or a set of frequencies chosen based upon gear ratio at which the driveline is currently operating. Such torque cancellation systems typically pass driveline inputs through signal conditioning filters, which may slow system responsiveness. Slow system response often leads to a "bump" or "overshoot" that occurs when there is an aggressive operator torque request, due to delays in transient responses required to develop filters.

Some systems use a single feedback variable, typically engine speed, and command a single control signal, typically engine torque. However, single feedback/single control vibration control systems do not provide adequate damping in a system having multiple devices operable to generate vibrations in a driveline. As such, other systems employ a multivariate feedback control approach to provide active driveline damping for a hybrid powertrain. This approach provides dynamic coordination of all torque commands to control the transient response of the driveline using the hybrid transmission, including engine torque commands, electric motor torque commands, and clutch torque commands, as well as other controllable torque inputs.

SUMMARY OF THE INVENTION

The present invention provides an improved method and apparatus for regulating active damping in hybrid vehicle powertrains. The control algorithms of the present invention detect improper steady-state oscillating damping torque commands to prevent the torque oscillation energy levels from producing a strain on the drivetrain if left unaddressed. Torque thresholds are used to determine when an oscillating torque's amplitude is big enough to be considered improper. This invention protects the driveline from steady state oscillations induced by hybrid active damping motor torque commands that could cause hardware degradation (e.g., shaft deterioration) when the state estimator becomes unstable due to active damping state estimator inputs failing by stabilizing the damping torque. The present invention is also useful during vehicle development to diagnose issues within the hybrid powertrain system that have triggered improper torque detection.

According to one embodiment of the present invention, a method of regulating active damping in a vehicle powertrain having one or more torque-generative devices is provided. The method includes: monitoring a damping torque command sent to the torque-generative device(s); determining a mean reference point, which may be a filtered value of the damping torque command; determining if the unfiltered damping torque command value switches about the mean reference point; if a switch is detected, determining if the switch magnitude (i.e., size of the switch) exceeds a predetermined switch magnitude minimum; if it does, then increasing a total number of switches; determining if the total number of switches exceeds a switch counter threshold; if the total number of switches exceeds the switch counter threshold, determining if the current damping torque exceeds a predetermined damping torque threshold. If the total number of switches exceeds the switch threshold and the current damping torque exceeds the damping torque threshold, the method responds by decreasing the damping torque command.

According to one aspect of this particular embodiment, a damping torque command "switch" includes the unfiltered damping torque command value switching from being greater than the mean reference point to less than the mean reference point, and vice versa.

As part of another aspect of this embodiment, the mean reference point is a filtered value of the damping torque command.

In accordance with another aspect, decreasing the damping torque command includes decreasing the damping torque multiplier to zero. To this regard, the damping torque multiplier is preferably decreased by ramping down the damping torque multiplier according to a calibrated ramp down rate. After the damping torque multiplier is set equal to zero for a predetermined time, it is also preferred that the method ramp up the damping torque multiplier according to a calibrated enable ramp rate.

As part of another aspect of this embodiment, the method also includes increasing a total number of samples if no switch is detected, or if a switch is detected and the switch magnitude exceeds the predetermined switch magnitude minimum, or the switch magnitude does not exceed the predetermined switch magnitude minimum. Thereafter, the method determines if the total number of samples exceeds a sample counter threshold; and, if the total number of samples does exceed the sample counter threshold, setting the total number of samples and total number of switches equal to zero.

According to yet another aspect, the method also includes determining if the vehicle powertrain performs a transient operation (e.g., the transmission shifts gears, the vehicle shifts modes, etc.) or the vehicle powertrain torque output exceeds a torque threshold. If either of these operations does occur, the method responds by setting the total number of samples and total number of switches equal to zero.

In yet another aspect of this embodiment, the damping torque command value is calculated using a parameter state estimator and a control gain feedback matrix.

According to another embodiment of the present invention, a method is provided for regulating an active damping system having at least one torque-generative device that is operable to selectively attenuate vibrations in a hybrid powertrain. The hybrid powertrain has an engine and one or more motor/generator assemblies that are selectively drivingly connectable to a power transmission.

In this embodiment, the method includes: monitoring the damping torque command sent to the torque-generative device(s) by the active damping system; filtering the damping torque command; detecting if a switch occurs—a "switch" occurs if the unfiltered damping torque command changes from being greater than the filtered damping torque command to less than the filtered damping torque command, or vice versa, and the magnitude of the switch exceeds a predetermined switch magnitude; incrementing a total number of switches each time a switch occurs; determining if the total number of switches exceeds a switch counter threshold within a preset sample period; determining if the current damping torque exceeds a predetermined damping torque threshold if the total number of switches does exceed the switch counter threshold; and decreasing the damping torque multiplier to zero if the current damping torque exceeds the predetermined damping torque threshold and the total number of switches exceeds the switch counter threshold.

As part of one aspect of this particular embodiment, decreasing the damping torque multiplier includes ramping down the damping torque multiplier according to a calibrated ramp down rate. Thereafter, the damping torque multiplier is increased or ramped up according to a calibrated enable ramp rate after the damping torque multiplier is equal to zero for a predetermined time.

In accordance with another aspect of this embodiment, the method also includes incrementing a total number of samples each time the method detects a switch has occurred. Thereafter, the method will then determine if the total number of samples exceeds a sample counter threshold, the vehicle powertrain performs a transient operation, or the torque output of the power transmission has increased significantly (i.e., exceeds a torque threshold). If the total number of samples exceeds the sample counter threshold, the vehicle powertrain performs a transient operation, or the power transmission torque output exceeds the torque threshold, the method responds by setting the total number of samples and total number of switches equal to zero, and then starts over.

In accordance with another embodiment of the present invention, a control apparatus for regulating an active damping system is provided. The active damping system includes at least one torque-generative device that is operable to generate a damping torque configured to attenuate vibrations in a hybrid powertrain having an engine and at least one motor selectively drivingly connectable to a power transmission. The control apparatus includes a controller that is in communication with each of the torque-generative devices. The controller is configured to control operation of the torque-generative devices and transmit damping torque command signals thereto.

The controller is programmed and configured to filter the damping torque command signal, and determine if the unfiltered damping torque switches from being greater than the filtered damping torque to less than the filtered damping torque, or vice versa, and if the magnitude of the switch exceeds a predetermined switch magnitude. The controller is also programmed and configured to increment a total number of switches each time the damping torque switches. The controller then determines if the total number of switches exceeds a switch counter threshold within a preset sample period. If the total number of switches exceeds the switch counter threshold, the controller is also programmed and configured to determine if the current damping torque exceeds a predetermined damping torque threshold and, if so, respond by decreasing the damping torque multiplier to zero.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

Figure 1:
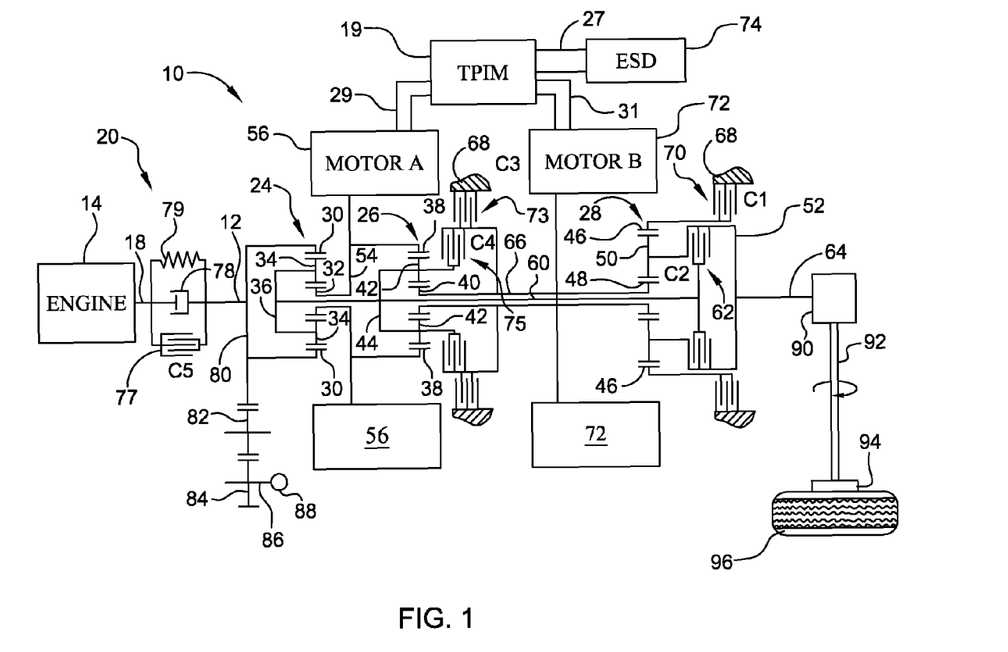
FIG. 1 is a schematic illustration of an exemplary motorized vehicle for integration and use of the present invention.

Referring to the drawings, wherein like reference numbers refer to like components throughout the several views, FIG. 1 is a schematic representation of an exemplary motorized vehicle with which the present invention may be utilized. The present invention is described herein in the context of a hybrid-type vehicle having a two-mode, compound-split, power transmission, offering a representative application by which the present invention may be incorporated and practiced. Accordingly, the present invention is in no way limited to the particular powertrain configuration illustrated in FIG. 1. By way of example, the present invention is applicable to any electric-hybrid vehicle, both series and parallel, full electric vehicles (EV), and any other motorized vehicle with an active driveline damping system therein. Finally, the hybrid vehicle shown in FIG. 1 has been greatly simplified, it being understood that further information regarding the standard operation of a hybrid powertrain or a hybrid-type vehicle may be found in the prior art.

Turning first to FIG. 1, the two-mode, compound-split, power transmission 10 has an input shaft 12, which may be in the nature of a shaft, for receiving power from a restartable engine 14. The engine 14 transfers power, preferably by way of torque, to the transmission 10 through an engine output member or crankshaft 18. A transient torque damper 20 is interposed between the crankshaft 18 of the engine 14 and the input shaft 12 of the hybrid transmission 10. The exemplary transient torque damper 20 of FIG. 1 comprises a torque transfer device 77 having characteristics of a damping mechanism and a spring, represented respectively at 78 and 79. The transient torque damper 20 permits selective engagement of the engine 14 with the hybrid transmission 10. The torque transfer device 77 preferably comprises a hydraulically operated friction clutch, which is also referred to herein as clutch C5.

In the embodiment depicted in FIG. 1, the engine 14 may be any of numerous forms of reciprocating-piston type internal combustion engines, such as a spark-ignited gasoline engine or a compression-ignited diesel engine, readily adaptable to provide its available power to the transmission 10 at a range of operating speeds, for example, from idle, at or near 600 revolutions per minute (RPM), to over 6,000 RPM. Irrespective of the means by which the engine 14 is connected to the input shaft 12 of the transmission 10, the input shaft 12 is connected to a planetary gear set 24 in the transmission 10.

The transmission 10 is adapted to manipulate and distribute power from the engine 14 to a final drive system, as will be explained in extensive detail hereinbelow. Referring again to FIG. 1, the hybrid transmission 10 utilizes one or more epicyclic gear arrangements, preferably in the nature of three interconnected planetary-gear sets 24, 26 and 28, respectively. The first planetary gear set 24 has an outer gear member 30, typically designated as the "ring gear", which circumscribes an inner gear member 32, which may be generally designated as a "sun gear". A plurality of planetary gear members 34 (also referred to in the art as "pinion gears") are rotatably mounted on a carrier member 36; each planetary gear member 34 is meshingly engaged with both the ring gear member 30 and the sun gear member 32.

The second planetary gear set 26 also has an outer "ring" gear member 38, which circumscribes an inner "sun" gear member 40. The ring gear member 38 is coaxially aligned and rotatable with respect to the sun gear member 40. A plurality of planetary gear members 42 are rotatably mounted on a carrier member 44 such that each planetary gear 42 meshingly engages both the ring gear member 38 and the sun gear member 40.

The third planetary gear set 28, similar to the first and second gear sets 24, 26, also has an outer "ring" gear member 46, which circumscribes an inner "sun" gear member 48. The ring gear member 46 is coaxially aligned and rotatable with respect to the sun gear member 48. A plurality of planetary or pinion gear members 50 are rotatably mounted on a carrier member 52; each planetary gear 50 meshingly engages both the ring gear member 46 and the sun gear member 48.

The three planetary gear sets 24, 26 and 28 each comprise simple planetary gear sets. However, each of the carrier members described above can be either a single-pinion (simple) carrier assembly or a double-pinion (or compound) carrier assembly. Furthermore, the first and second planetary gear sets 24, 26 are compounded in that the sun gear member 32 of the first planetary gear set 24 is conjoined, as through a hub plate gear 54, to the ring gear member 38 of the second planetary gear set 26. The conjoined sun gear member 32 of the first planetary gear set 24 and the ring gear member 38 of the second planetary gear set 26 are continuously connected to a first motor/generator 56, also referred to as 'Motor A'.

The first and second planetary gear sets 24, 26 are further compounded in that the carrier member 36 of the first planetary gear set 24 is conjoined, as through an intermediate shaft 60, to the carrier member 44 of the second planetary gear set 26. As such, carrier members 36, 44 of the first and second planetary gear sets 24, 26, respectively, are conjoined. The intermediate shaft 60 is also selectively connectable to the carrier member 52 of the third planetary gear set 28, as through a torque transfer device 62 (C2). As will be hereinafter more fully explained, the torque transfer device 62 is employed to assist in the selection of the operational modes of the hybrid transmission 10. The carrier member 52 of the third planetary gear set 28 is connected directly to the transmission output member 64, which may be in the nature of a shaft.

In the exemplary embodiment described herein, wherein the hybrid transmission 10 is used in a land vehicle, the transmission output shaft 64 is operatively connected to a final drive system, also referred to herein as "driveline", comprising a differential 90 or other torque transfer device which provides torque output to one or more vehicular axles 92 or half-shafts (not shown). The axles 92, in turn, deliver torque to drive members, represented herein as vehicle wheel(s) 96. The wheels 96 may be either front or rear wheels of the vehicle on which they are employed, or they may be a drive gear of a track vehicle. The wheels 96 may have some form of wheel brake, represented schematically at 94, associated therewith. The wheels 96 each have a speed parameter comprising rotational speed of each wheel 96, which is typically measurable with a wheel speed sensor. Although not specifically illustrated in FIG. 1, it should be appreciated that the final drive system may comprise any known configuration—e.g., front wheel drive (FWD), rear wheel drive (RWD), four-wheel drive (4 WD), or all-wheel drive (AWD), within the scope of the present invention.

The sun gear member 40 of the second planetary gear set 26 is continuously connected to the sun gear member 48 of the third planetary gear set 28, as through a sleeve shaft 66 that circumscribes intermediate shaft 60. The ring gear member 46 of the third planetary gear set 28 is selectively connected to a stationary member, represented in FIG. 1 by transmission housing 68, through a torque transfer device 70 (also identified as "C1"). Torque transfer device 70, as is hereinafter explained, is also employed to assist in the selection of the operational modes of the hybrid transmission 10. The sleeve shaft 66 is also continuously connected to a second motor/generator 72, also referred to as "Motor B".

All of the planetary gear sets 24, 26, 28, as well as the first and second motor/generators 56, 72, are coaxially oriented, as about the axially disposed intermediate transmission shaft 60. Motor/generators 56, 72 are both of an annular configuration which permits them to circumscribe the three planetary gear sets 24, 26, 28. For instance, the planetary gear sets 24, 26, 28 are shown nested inside—i.e., disposed radially inwardly of, the first and second motor/generators 56, 72. This configuration assures that the overall envelope, i.e., the circumferential and longitudinal dimensions, of the hybrid transmission 10 are minimized.

A torque transfer device 73 (C3) selectively connects the sun gear 40 with the transmission housing 68. A torque transfer device 75 (C4) is operative as a lock-up clutch, locking planetary gear sets 24, 26, motor/generators 56, 72, and the input to rotate as a group, by selectively connecting the sun gear 40 with the carrier member 44. In the exemplary embodiment of FIG. 1, the torque transfer devices 62, 70, 73, 75 are all friction clutches. Each clutch is preferably hydraulically actuated, receiving pressurized hydraulic fluid from a pump (not shown). Hydraulic actuation is accomplished using a conventional hydraulic fluid circuit, which is not described in detail herein.

The hybrid transmission 10 receives input motive torque from a plurality of "torque-generative devices", which include the engine 14 and motors/generators 56, 72, as a result of energy conversion from fuel stored in a fuel tank or electrical potential stored in an electrical energy storage device (ESD) 74. That is, the engine 14 and motor/generators A, B operate, individually or in concert, in conjunction with the planetary gear sets and selectively engageable torque transmitting mechanisms highlighted above, to rotate the transmission output shaft 64. The motor/generator assemblies A, B are preferably configured to selectively operate as both a motor and a generator. That is, the motor/generator assemblies A, B are capable of converting electrical energy to mechanical energy (e.g., during vehicle propulsion), and converting mechanical energy to electrical energy (e.g., during regenerative braking).

The ESD 74 typically comprises a hybrid battery pack, including an array of battery modules. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist, and electric range. The ESD 74 is high voltage DC-coupled to transmission power inverter module (TPIM) 19 via DC lines or transfer conductors 27. The TPIM 19 communicates with the first motor/generator 56 by first transfer conductors 29, and the second motor/generator 72 by second transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective motor over transfer conductors 29, 31. In regeneration control, the respective inverter receives AC current from the motor over transfer conductors 29, 31 and provides current to the DC lines 27. The net DC current provided to or from the inverters determines the charge or discharge operating mode of the ESD 74. Ideally, Motor A 56 and Motor B 72 are three-phase AC machines, and the inverters comprise complementary three-phase power electronics.

Referring again to FIG. 1, a drive gear 80 may be presented from the input shaft 12. As depicted, the drive gear 80 continuously connects the input shaft 12 to the ring gear member 30 of the first planetary gear set 24. The drive gear 80 receives power from the engine 14, the first motor/generator 56, the second motor/generator 72, or any combination thereof. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Figure 2:
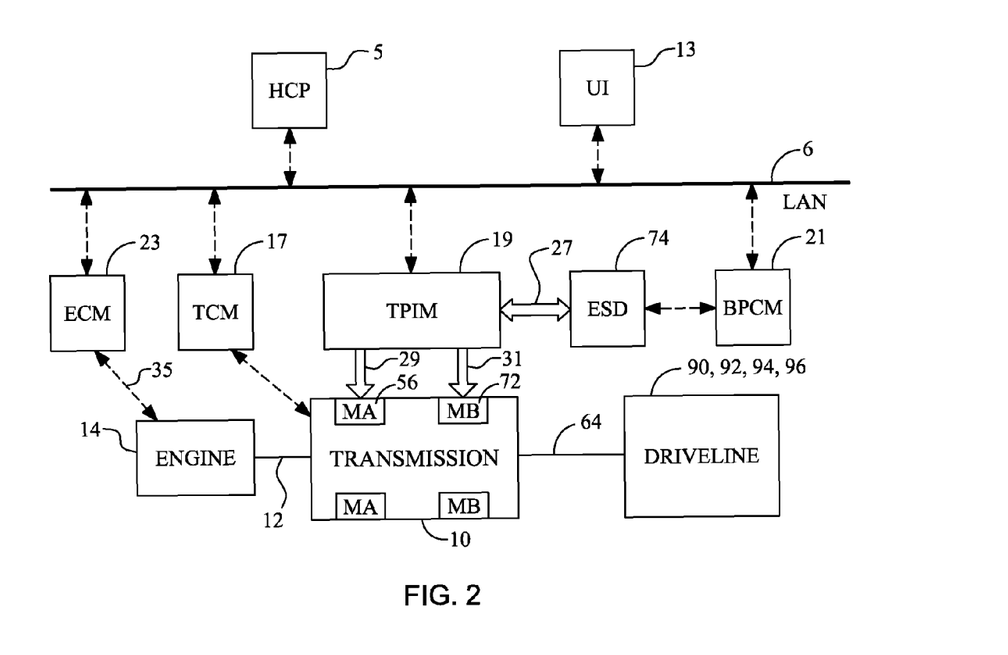
FIG. 2 is a schematic diagram of an exemplary control apparatus in accordance with the present invention.

Turning to FIG. 2, a schematic block diagram of a control apparatus, comprising a distributed controller architecture, is shown. The control apparatus of FIG. 2 is operable, as described hereinafter, to provide coordinated system control of the powertrain system depicted and described herein. The constituent elements of the control apparatus comprise a subset of an overall vehicle control system. The control system is operable to synthesize pertinent information and inputs, and execute control methods and algorithms, such as the method illustrated in FIG. 4, to control various actuators to achieve control targets, including such parameters as fuel economy, emissions, performance, driveability, and protection of drivetrain hardware, such as, but certainly not limited to, transmission 10, first and second motor/generators 56, 72, and ESD 74.

The distributed controller architecture includes Engine Control Module (ECM) 23, Transmission Control Module (TCM) 17, Battery Pack Control Module (BPCM) 21, and Transmission Power Inverter Module (TPIM) 19. A hybrid control module (HCP) 5 provides overall control and coordination of the aforementioned controllers. A User Interface (UI) 13 is operatively connected to a plurality of devices (not individually shown) through which a vehicle operator typically controls or directs operation of the powertrain, including the transmission 10. Exemplary vehicle operator inputs to the UI 13 include an accelerator pedal, a brake pedal, transmission gear selector, and vehicle speed cruise control. Each of the aforementioned controllers communicates with other controllers, sensors, and actuators via a local area network (LAN) bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, the HCP 5 generates various commands, including, but not limited to, an engine torque command, clutch torque commands, e.g., for the various clutches C1-C4 of the hybrid transmission 10, and motor torque commands, for the Motors A and B.

The ECM 23 is operatively connected to the engine 14. The ECM 23 is configured to acquire data from a variety of sensors and control a variety of actuators, respectively, of the engine 14 over a plurality of discrete lines, shown in aggregate as line 35. The ECM 23 receives an engine torque command from the HCP 5, and generates a desired axle torque, and an indication of actual engine torque, which is communicated to the HCP 5. For simplicity, ECM 23 is shown generally having bidirectional interface with engine 14 via aggregate line 35. Various other parameters that may be sensed by ECM 23 include engine coolant temperature, engine input speed to the transmission, manifold pressure, and ambient air temperature and pressure. Various actuators that may be controlled by the ECM 23 include, for example, fuel injectors, ignition modules, and throttle control modules.

The TCM 17 is operatively connected to the transmission 10, and functions to acquire data from a variety of sensors and provide command signals to the transmission 10. Inputs from the TCM 17 to the HCP 5 include estimated clutch torques for each of the clutches C1-C4, and rotational speed of the transmission output shaft 64. Additional actuators and sensors may be used to provide additional information from the TCM to the HCP for control purposes.

The BPCM 21 is in signaling communication with a plurality of sensors (not explicitly shown) that are operable to monitor electrical current or voltage parameters of the ESD 74 to provide information about the state and health of the batteries to the HCP 5. Such information includes battery state-of-charge, temperature, and other states of the batteries, including voltage and available power.

With continuing reference to FIG. 2, the TPIM 19 includes a pair of power inverters and motor controllers configured to receive motor control commands and control inverter states therefrom to provide motor drive or regeneration functionality. The TPIM 19 is operable to generate torque commands for Motors A and B, based, at least in part, upon input from the HCP 5, which is driven by operator input through UI 13 and system operating parameters. The predetermined torque commands for Motors A and B are adjusted with motor damping torques to determine motor torques, which are implemented by the control system, including the TPIM 19, to control the motors A and B. Individual motor speed signals for Motor A and Motor B are derived by the TPIM 19 from the motor phase information or conventional rotation sensors. The TPIM 19, in turn, determines and communicates motor speeds to the HCP 5. The electrical energy storage device 74 is high-voltage DC-coupled to the TPIM 19 via DC lines 27. Electrical current is transferable to/from the TPIM 19 in accordance with whether the ESD 74 is being charged or discharged.

Each of the aforementioned controllers is preferably a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are preferably executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals—e.g., each 3, 6.25, 15, 25 and 100 milliseconds, during vehicle operation.

In response to operator input, as captured by the UI 13, the supervisory HCP controller 5 and one or more of the other controllers shown in FIG. 2 determine required transmission output torque. Selectively operated components of the hybrid transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, which affects how and when the vehicle accelerates or decelerates. Final vehicle acceleration is affected by other variables, including such factors as road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

Operation of the hybrid vehicle shown in FIG. 1 may be adversely affected by torque oscillations that occur when abrupt torque changes are encountered in the operation of transmission 10, engine 14, and motor/generators 56, 72. Such oscillations are encountered, for example, during launching, shifting, and mode changes. The damping of such torque oscillations will enhance vehicle drivability and performance, increase operational life expectancy of the powertrain, and improve operator satisfaction. Coordinated control of the torque-generative devices—i.e., engine 14 and motor/generators 56, 72, may be used to provide such damping.

Figure 3:
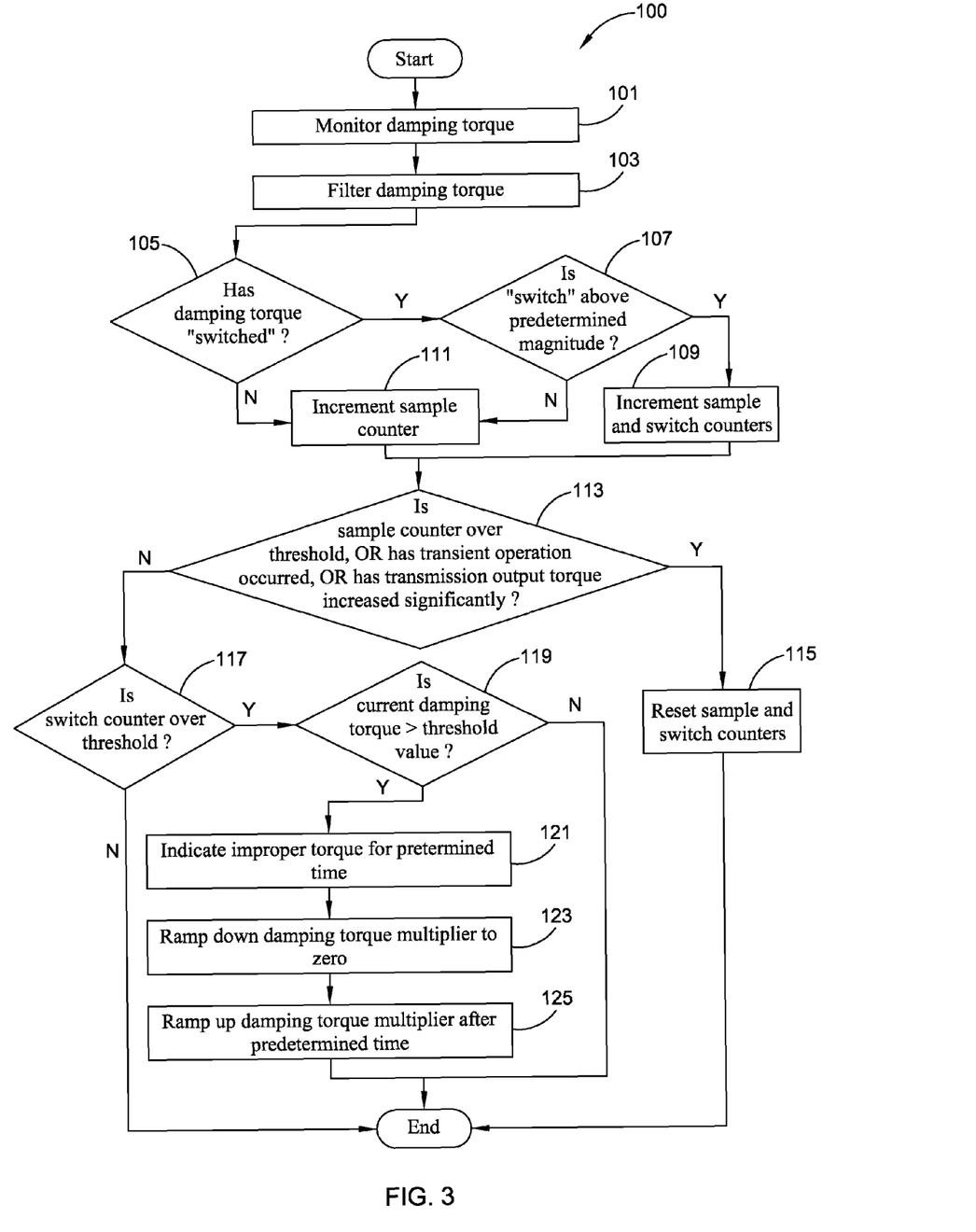
FIG. 3 is a flow chart or block diagram illustrating a control algorithm or method of regulating hybrid active driveline damping in accordance with a preferred embodiment of the present invention.

With reference now to the flow chart shown in FIG. 3, an algorithm for multivariate active driveline damping, namely an improved method for regulating active damping in a vehicle powertrain, is shown generally at 100 in accordance with a preferred embodiment of the present invention. The method or algorithm 100 is described herein with respect to the structure illustrated in FIGS. 1 and 2, preferably executed as algorithms in the controllers of the control system described hereinabove with reference to FIG. 2, to control operation of the system described with reference to FIG. 1. However, the present invention may also be incorporated into other vehicle configurations, and applied to other powertrain arrangements. In addition, the method 100 preferably includes at least steps 101-125. However, it is within the scope and spirit of the present invention to omit steps, include additional steps, and/or modify the order presented in FIG. 3. It should be further noted that the method 100 represents a single operation. However, it is expected, as indicated above, that the method 100 be applied in a systematic and repetitive manner.

Multivariate active driveline damping comprises basic elements for controlling torque outputs from the torque-generative devices 14, 56, 72 through the transmission 10 to the driveline. This includes the overall control elements of determining reference parameters for a plurality of operating states, based upon current operating conditions and desired operating conditions, through a desired dynamics control scheme. The motor damping torque control scheme is operable to determine motor damping torques for controlling the torque-generative devices, i.e. Motor A and Motor B, based upon the aforementioned reference parameters, and a plurality of operating state errors that comprise feedback from the powertrain and driveline, each which have determinable dynamic properties Outputs of the desired dynamics segment comprise a plurality of reference values for axle torque, damper torque, and various speeds. The reference values and the plurality of operating state errors calculated from outputs of the driveline comprise inputs to a motor damping torque control scheme. The motor damping torque control scheme is executed to determine damping torques to the torque-generative devices, in this embodiment to Motors A and B. Driveline dynamic control comprises controlling inputs to each torque-generative device and other torque devices in the transmission and driveline, based upon the operating state errors and the reference states.

In overall operation, the driveline dynamics estimator is a mathematical model comprising a plurality of linear equations executed as algorithms within one of the controllers. The mathematical model equations, including calibration values, are executed using algorithms to model representations of operation of the exemplary powertrain described with reference to FIGS. 1 and 2, taking into account application-specific masses, inertias, friction factors, and other characteristics and parameters of the driveline that affect various operating states. Estimating state parameters for the aforementioned powertrain system includes monitoring operating rotational speed for each of the torque-generative devices, in this case Motors A and B, and engine 14. The engine output speed is measured at crankshaft 18, transmission input is measured at transmission input shaft 12, whereas the output rotational speed of the transmission 10 is measured at output shaft 64. Torque commands from the control system to the torque-generative devices are determined. Additionally, a plurality of driveline torque loads are also determined and used as input(s).

The abovementioned mathematical model equations are executed in one of the controllers to estimate each state parameter, including damper torque, desired axle torque, the individual motor speed signals, rotational speed of the output shaft, engine input speed, and wheel speed, using as inputs, for example, the operating speed for each of the torque-generative devices, the output speed of the transmission device, the torque commands to the torque-generative devices, and the torque loads. The distributed controller architecture shown in FIG. 2, and the algorithmic structure described herein is executed in a manner that causes estimation of the aforementioned state parameters to be achieved in real-time. To be more precise, calculation of each estimated state occurs during a single clock cycle of the controller so there is limited or no lag time in determining the various states, thus eliminating or minimizing potential for loss of control of the system. Input parameters to the driveline dynamics estimator include, for example, motor torque values, engine torque, clutch torques to clutches C1, C2, C3, C4, brake torque, accessory load, road load, and the transmission operating mode.

The mathematical model equations are applied to the aforementioned inputs to dynamically calculate estimated output state parameters of the driveline, including estimated damper torque, estimated axle torque, estimated motor speeds, estimated output speed, estimated engine input speed, and estimated wheel speed, based upon the input parameters indicated above. A first speed matrix comprising the estimated speeds is subtracted from a second speed matrix comprising measured speeds output from driveline dynamic control. The resultant matrix is input to an estimator, where it is multiplied by one of a plurality of gain matrices to determine a matrix of estimated state corrections. Each of the gain matrices comprises a matrix of scalar gain factors, preferably determined for each transmission operating mode—i.e. the specific operating mode and gear configuration. In preferred practice, the gain matrices are determined off-line, and stored as calibration values in one of the on-board controllers. There are preferably at least two sets of gain matrices developed and executed as part of the estimator feedback gain action, wherein one set is for use when the driveline is in a neutral lash state, and one set is for use when the driveline is in a drive state.

The matrix of estimated state corrections is used as feedback by the driveline dynamics estimator in determining the dynamically calculated estimated output states of the driveline based upon the input parameters. When the first speed matrix comprising the estimated speeds is equal to the second speed matrix comprising the measured speeds, it is determined that the outputs of the estimator are accurate measurements of actual operating states of the driveline.

The operating parameters in the powertrain may unexpectedly change or inexplicably vary, which may lead to the damping torque(s) generated by the torque-generative device(s) inadvertently creating new torque oscillations, or exacerbating existing unwanted oscillations. The control algorithms of the present invention detect improper steady-state oscillating damping torque commands to prevent the torque oscillation energy levels from producing a strain on the drivetrain if allowed to continue.

Looking to FIG. 3, specifically step 101 of the method 100, the HCP 5 is operable to monitor, in a preferably continuous manner, the damping torque commands sent to the various torque-generative devices. The damping torques commands are calculated, as described above, using parameter state estimators and a control gain feedback matrix. The magnitude and dynamic characteristics of the damping torque command one may come to expect in an active driveline damping system is shown for explanatory purposes in FIG. 4 with phantom-line 201. The damping torque command 201, as presented in FIG. 4, has a maximum magnitude of 20 Newton-meters (Nm); the maximum damping output, however, may be tailored (i.e., increased or decreased) to meet the architecture and specific design criteria of the intended application.

The algorithm then detects damping torque command oscillation by counting the number of switches around a mean reference point within a predetermined sample period. In step 103, a mean reference point is calculated, for example, by filtering the damping torque command signal. Specifically, the damping torque command signal is processed using a standard electronic signal filter, such as, but certainly not limited to, a low-pass or a high-pass filter, a Kalman filter, a Butterworth filter, etc., to determine a filtered damping torque command value, indicated in FIG. 4 by solid-line 203. The filtered damping torque command value 203 is typically zero at vehicle startup, but will vary in magnitude depending upon the magnitude of the actual, unfiltered damping torque 201. Ideally, the filter coefficient, typically a first order lag filter coefficient, should be set such that the damping torque, used to detect switches, is heavily filtered.

Figure 4:
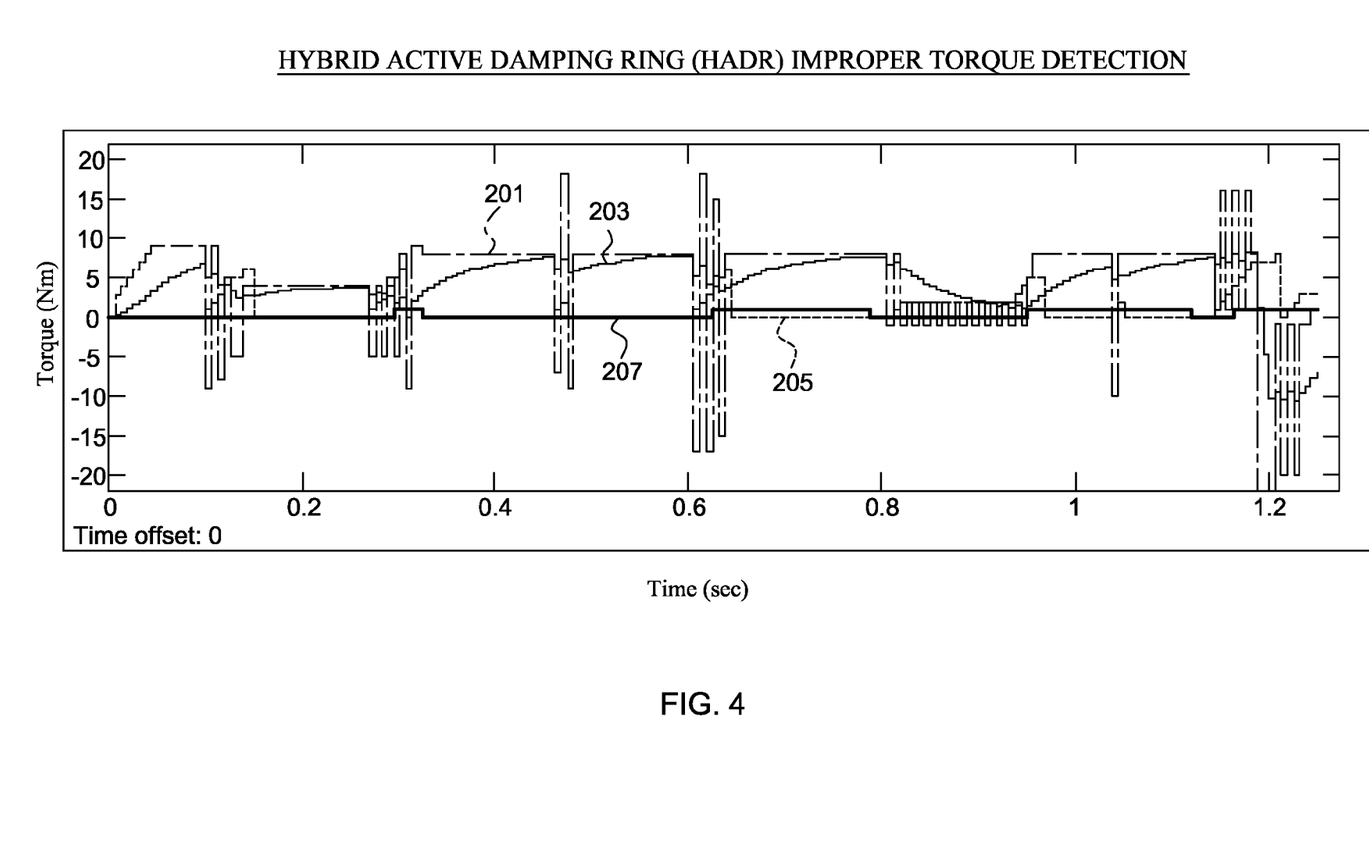
FIG. 4 is a graphical representation illustrating the relationship between active driveline damping torque, filtered damping torque, switch counter, and improper torque indicator.

Contemporaneous with or subsequent to step 103, the method 100 tracks and counts each time the unfiltered damping torque signal switches around the mean reference point within a predetermined sample period, e.g., 6.25 milliseconds (msec). The more samples taken in a given period, the easier it is for the method 100 to detect improper damping torques. Switch detection occurs if: (a) a sample passes from one side of the mean reference point (e.g., filtered damping torque value 203) to the other side, and (b) the difference between the two samples is greater than a calibration threshold. Accordingly, the hybrid control module (HCP) 5, while actively monitoring the damping torque command, will determine in step 105 if a switch occurs. If a switch does occur, the HCP 5 will then, in step 107, determine whether the magnitude of the switch (i.e., peak-to-crest or crest-to-peak value) exceeds a predetermined switch magnitude. The calibrated switch magnitude threshold may be manipulated, for example, to limit or eliminate the possibility of a false positive triggering an improper torque indicator. For example, the higher the value, the less likely noise in the signal will trigger an improper torque flag.

Each time a switch occurs that is greater than the calibrated switch magnitude threshold, the HCP 5 will increment (i.e., increase by one) a switch counter in step 109. For example, a representative "switch counter", shown with dashed-line 205 in FIG. 4, increments each time the unfiltered damping torque 201 changes from being greater than the filtered damping torque 203 to less than the filtered damping torque, or vice versa, and the magnitude of that particular switch is greater than 4 Nm. In one instance, for example, the switch counter 205 increments six total switches between 0.60 seconds and 0.64 seconds. Each time the HCP 5 takes a sample—e.g., damping torque is monitored, but no switch is detected (Step 105=No); a switch is detected, but the switch magnitude does not exceed the predetermined switch magnitude minimum (Step 105=Yes, Step 107=No); or a switch is detected and the switch magnitude is greater than the predetermined switch magnitude minimum (Step 105=Yes, Step 107=Yes), a sample counter is incremented in step 111. The switch counter is reset to zero on every wakeup of the HCP 5, typically on an ignition start.

The number of switches and samples are reset whenever a shift occurs, or when a significant output torque change is detected. For example, in step 113, the HCP 5 will determine if the total number of samples taken exceeds a sample counter threshold within the preset sample period. If so, the sample and switch counters are reset in step 115 of FIG. 3, and the control method 100 ends. In a similar regard, the HCP 5 will also monitor the vehicle powertrain in step 113 to detect if a transient operation occurs—e.g., the transmission shifts gears, the vehicle shifts modes, etc., or the torque output of the power transmission has increased significantly—i.e., exceeds a calibrated torque output threshold. If either of these operations does occur, the method responds, again in step 115, by setting the total number of samples and total number of switches equal to zero. Resetting during these instances prevents switch counter increments due to transient changes that will cause damping torques to cross the mean reference point of the filtered signal.

Prior to, contemporaneous with, or after step 113, the HCP 5 will determine, as indicated in step 117, if the total number of switches in a sample period exceeds a calibrated switch counter threshold. If the total number of switches does not exceed the switch counter threshold, the method 100 terminates (and preferably begins again at step 101). If, however, the total number of switches does exceed the calibrated switch counter threshold, the HCP 5 will verify if the current damping torque exceeds a predetermined damping torque threshold, as shown in step 119.

The calibrated number of samples and switches correlates to the minimum frequency detectable, which is on the order of 2.5 Hertz (Hz) in the exemplary embodiment of FIG. 4. In other words, a combination of the number of samples and the number of switches translates into a frequency in Hertz, which is the lowest frequency in which the algorithm can detect an oscillation. For example, 32 samples and 5 switches will allow detection of a 10 Hz frequency; 64 samples and 5 switches allows for a 5 Hz frequency detection; and, 128 samples and 5 switches allows for 2.5 Hz detection.

If the total number of switches exceeds the switch threshold (Step 117=Yes) and the current damping torque exceeds the damping torque threshold (Step 119=Yes), an "improper torque indicator" is set, in step 121, and the HCP 5 responds by decreasing the damping torque command, in step 123. A representative improper torque indicator is shown in FIG. 4 with bold-line 207. The improper torque indicator 207 is set or "triggered" on three separate occasions in FIG. 4—at approximately 0.30 sec, 0.62 sec, 0.95 sec, and 1.16 sec.

One manner of stabilizing the current damping torque includes decreasing the damping torque multiplier to zero. As noted above, the damping torque multiplier is the control gain on the final damping torque output. If the damping torque multiplier is equal to one, for example, then the damping torque is unmodified. If, however, the damping torque multiplier is equal 0.5, then the damping torque is cut in half, and, likewise, if the damping torque multiplier is equal to zero then the damping torque will be zero. In accordance with preferred practice, the damping torque multiplier is decreased by progressively ramping down the damping torque multiplier according to a predetermined ramp down rate, which is calibration controlled. For example, the improper torque indicator 207 is first triggered after 0.30 seconds, yet the unfiltered damping torque 201 is not completely stabilized for a few msec. After the damping torque multiplier is set equal to zero for a predetermined time, the HCP 5 will command ramp up the damping torque multiplier according to a calibrated enable ramp rate, as indicated in step 125, such that the active driveline damping system can return to normal operation until a subsequent improper torque indicator is set.

While the best modes for carrying out the present invention have been described in detail, those familiar with the art to which this invention pertains will recognize various alternative designs and embodiments for practicing the invention within the scope of the appended claims.

The invention claimed is:
1. A method for regulating active damping in a vehicle powertrain having at least one torque-generative device, the method comprising:
providing a controller having a processor configured for:
monitoring a damping torque command sent to the at least one torque-generative device over a time period;
determining a mean reference point of the damping torque command over the time period;
determining if a value of said damping torque command switches about said mean reference point;
determining if a switch magnitude exceeds a predetermined switch magnitude minimum if said damping torque command value switched about said mean reference point;
increasing a total number of switches if said switch magnitude exceeds said predetermined switch magnitude minimum;
determining if said total number of switches exceeds a switch counter threshold;

determining if a current damping torque exceeds a predetermined damping torque threshold if said total number of switches exceeds said switch counter threshold; and decreasing said damping torque command if said current damping torque exceeds said predetermined damping torque threshold.

2. The method of claim 1, wherein determining if the value of said damping torque command value switches about said mean reference point includes determining if the value of said damping torque command value switches from one of greater than or less than said mean reference point to the other of greater than or less than said mean reference point.

3. The method of claim 1, wherein determining said mean reference point of the damping torque command includes filtering the value of the damping torque command to calculate the mean reference point of the damping torque command.

4. The method of claim 1, wherein decreasing said damping torque command includes decreasing a damping torque multiplier to zero.

5. The method of claim 4, wherein decreasing said damping torque multiplier includes ramping down said damping torque multiplier according to a calibrated ramp down rate.

6. The method of claim 5 wherein the controller is further configured for ramping up said damping torque multiplier according to a calibrated enable ramp rate after said damping torque multiplier is equal to zero for a predetermined time.

7. The method of claim 1 wherein the controller is further configured for:
increasing a total number of samples if said damping torque command value has not switched about said mean reference point, said switch magnitude exceeds said predetermined switch magnitude minimum, or said switch magnitude does not exceed said predetermined switch magnitude minimum;
determining if said total number of samples exceeds a sample counter threshold; and
setting said total number of samples and total number of switches equal to zero if said total number of samples exceeds said sample counter threshold.

8. The method of claim 7 wherein the controller is further configured for:
determining if one of the vehicle powertrain performs a transient operation and the vehicle powertrain torque output exceeds a torque threshold; and
setting said total number of samples and total number of switches equal to zero if the vehicle powertrain performs a transient operation or the vehicle powertrain torque output exceeds said torque threshold.

9. The method of claim 1, wherein said damping torque command value is based at least in part upon a parameter state estimator and a control gain feedback matrix.

10. A method for regulating an active damping system having at least one torque-generative device operable to selectively attenuate vibrations in a hybrid powertrain having an engine and at least one motor/generator assembly selectively drivingly connectable to a power transmission, the method comprising:
providing a controller having a processor configured for:
monitoring a damping torque command sent to the at least one torque-generative device by the active damping system;
filtering said damping torque command;
detecting if a switch occurs, said switch including said damping torque command switching from one of greater than or less than said filtered damping torque command to the other of greater than or less than said filtered damping torque command and a magnitude of said switch exceeding a predetermined switch magnitude;
incrementing a total number of switches if said switch occurs;
determining if said total number of switches exceeds a switch counter threshold within a preset sample period;
determining if a current damping torque exceeds a predetermined damping torque threshold if said total number of switches exceeds said switch counter threshold; and
decreasing a damping torque multiplier to zero if said current damping torque exceeds said predetermined damping torque threshold to prevent the damping torque command from being applied to the at least one torque-generative device.

11. The method of claim 10, wherein decreasing said damping torque multiplier includes ramping down said damping torque multiplier according to a calibrated ramp down rate.

12. The method of claim 11 wherein the controller is further configured for ramping up said damping torque multiplier according to a calibrated enable ramp rate after said damping torque multiplier is equal to zero for a predetermined time.

13. The method of claim 11 wherein the controller is further configured for:
incrementing a total number of samples in response to detecting if a switch occurs;
determining if one of said total number of samples exceeds a sample counter threshold, the vehicle powertrain performs a transient operation, and a torque output of the power transmission exceeds a torque threshold; and
setting said total number of samples and total number of switches equal to zero if said total number of samples exceeds said sample counter threshold, the vehicle powertrain performs a transient operation, or the power transmission torque output exceeds said torque threshold.

14. A control apparatus for regulating an active damping system having at least one torque-generative device operable to generate a damping torque configured to attenuate vibrations in a hybrid powertrain having an engine and at least one motor selectively drivingly connectable to a power transmission, the apparatus comprising:
a controller in operative communication with the at least one torque-generative device and configured to control operation of the same, wherein said controller selectively distributes a damping torque command signal to the least one torque-generative device;
wherein said controller is programmed and configured to filter said damping torque command signal and determine if said damping torque command signal switches from one of greater than or less than said filtered damping torque command signal to the other of greater than or less than said filtered damping torque command signal and a magnitude of said switch exceeding a predetermined switch magnitude;
wherein said controller is programmed and configured to increment a total number of switches each time said damping torque command signal switches and determine if said total number of switches exceeds a switch counter threshold within a preset sample period; and
wherein said controller is programmed and configured to determine if a current damping torque exceeds a predetermined damping torque threshold if said total number of switches exceeds said switch counter threshold, and respond by decreasing a damping torque multiplier to zero if said current damping torque exceeds said predetermined damping torque threshold.

15. The apparatus of claim 14, wherein said controller decreases said damping torque multiplier by ramping down said damping torque multiplier according to a calibrated ramp down rate.

16. The apparatus of claim 14, wherein said controller is further programmed and configured to ramp up said damping torque multiplier according to a calibrated enable ramp rate after said damping torque multiplier is equal to zero for a predetermined time.

17. The apparatus of claim 14, wherein said controller is further programmed and configured to increment a total number of samples in response to detecting if a switch occurs; determine if one of said total number of samples exceeds a sample counter threshold, the powertrain performs a transient operation, and a torque output of the power transmission exceeds a torque threshold; and set said total number of samples and total number of switches equal to zero if said total number of samples exceeds said sample counter threshold, the powertrain performs a transient operation, or the power transmission torque output exceeds said torque threshold.

* * * * *